US012430626B2

(12) United States Patent
Crockett et al.

(10) Patent No.: US 12,430,626 B2
(45) Date of Patent: *Sep. 30, 2025

(54) RADIO FREQUENCY IDENTIFICATION (RFID) SELF-CHECKOUT (SCO) STATION HAVING A VARIABLE APERTURE FOR A SELECTIVELY SIZED SCAN ZONE

(71) Applicant: Toshiba Global Commerce Solutions, Inc., Durham, NC (US)

(72) Inventors: Timothy W. Crockett, Raleigh, NC (US); Brad M. Johnson, Raleigh, NC (US); David John Steiner, Durham, NC (US); Kimberly Wood, Raleigh, NC (US)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 343 days.

This patent is subject to a terminal disclaimer.

(21) Appl. No.: 18/127,252

(22) Filed: Mar. 28, 2023

(65) Prior Publication Data

US 2024/0330887 A1  Oct. 3, 2024

(51) Int. Cl.
*G06Q 20/18* (2012.01)
*G06K 7/10* (2006.01)
*G06Q 20/20* (2012.01)

(52) U.S. Cl.
CPC ......... *G06Q 20/18* (2013.01); *G06K 7/10366* (2013.01); *G06Q 20/208* (2013.01)

(58) Field of Classification Search
CPC .................. G06K 7/1096; G06K 7/10366
USPC ................. 235/383, 439, 441, 451
See application file for complete search history.

(56) References Cited

U.S. PATENT DOCUMENTS

| 2022/0302593 | A1  | 9/2022  | Kornaros et al. |
| 2023/0266636 | A1  | 8/2023  | Koch |
| 2024/0330886 | A1* | 10/2024 | Crockett .............. G06Q 20/208 |

OTHER PUBLICATIONS

Li, M. et al., "A Band-Notched Antenna With Two Radiation Zeros Using Grounded Coplanar Waveguide Filter for 2.4/5 GHz WLAN Applications", frontiers in Physics, vol. 9, Article 769949, Nov. 5, 2021, pp. 1-10, Frontier in Physics.
Tsui, C., et al., "Advancements in Beam Manipulation and Dynamic Control of Electromagnetic Waves Using Metamaterial Arrays and Voltage-Tunable Periodic Structures", University of Washington ProQuest Dissertations & Theses, 2023, pp. 1-117.

* cited by examiner

*Primary Examiner* — Suezu Ellis
(74) *Attorney, Agent, or Firm* — COATS & BENNETT, PLLC

(57) ABSTRACT

A Radio Frequency Identification (RFID) enabled Self-Checkout (SCO) station includes an RF antenna that emits RF energy, such as RFID interrogation signals, through the variable apertures of one or more aperture layers into a scan zone. The size of the scan zone is selectively varied by electrically modifying the effective size of the variable aperture in the aperture layer.

20 Claims, 13 Drawing Sheets

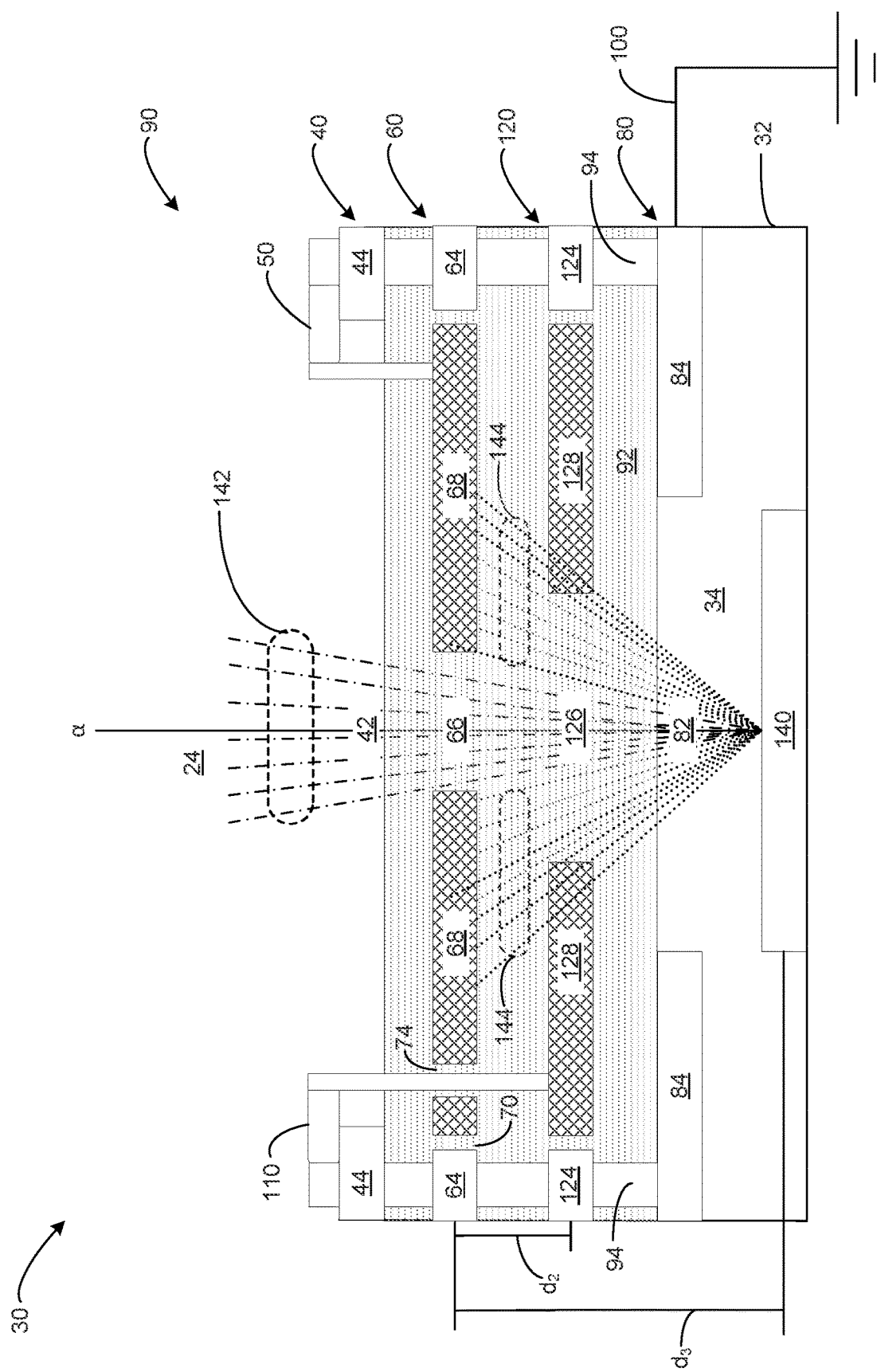

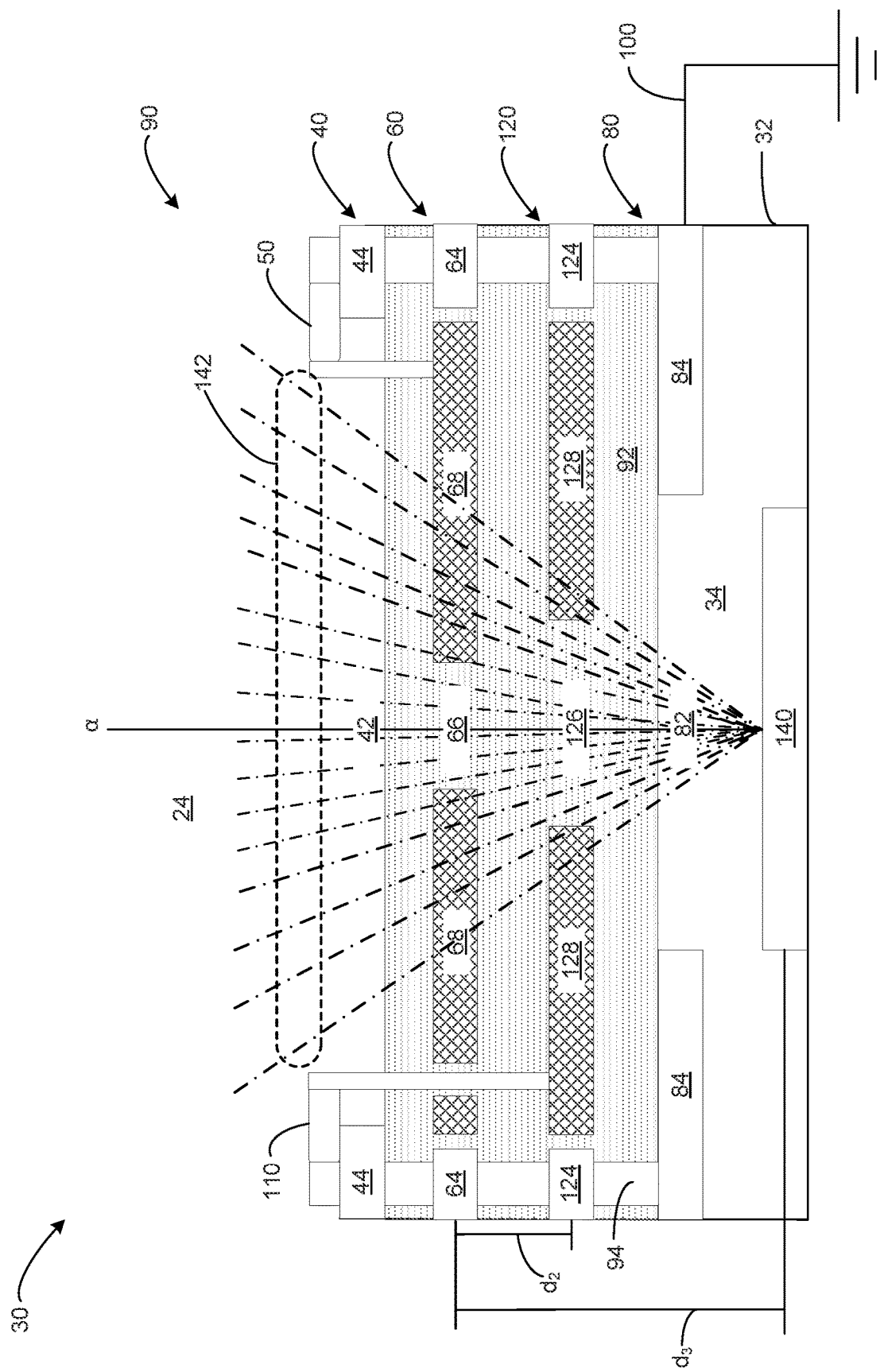

PROCESSING CIRCUITRY
160

RFID ANTENNA CONTROL UNIT/MODULE
170

SCAN ZONE ADJUSTER CONTROL UNIT/MODULE
172

PROXIMITY DETECTION UNIT/MODULE
174

TIMER UNIT/MODULE
176

INPUT/OUTPUT UNIT/MODULE
178

FIG. 10

RADIO FREQUENCY IDENTIFICATION (RFID) SELF-CHECKOUT (SCO) STATION HAVING A VARIABLE APERTURE FOR A SELECTIVELY SIZED SCAN ZONE

BACKGROUND

Radio Frequency Identification (RFID) self-checkout (SCO) stations currently enjoy increasing popularity in retail scenarios. Their popularity is due, in part, to the fact that they simplify scanning procedures and reduce the amount of time customers must spend checking out. With such systems, customers who are ready to checkout place a basket, for example, on the surface of a table of an SCO station. The basket contains all the products the customer has selected for purchase with each product having an associated RFID tag. Once placed on the table, an RFID antenna in the SCO station emits an interrogation signal triggering the RFID tags of all the products in the basket to send information about that product at once. Based on that received information, the SCO station identifies the products and displays the information identifying the products and their costs on a monitor for the customers. The customer can then pay for the products and leave the store.

BRIEF DESCRIPTION OF THE DRAWINGS

FIGS. 6A-6D illustrate a Radio Frequency ID (RFID) assembly including the aperture assembly of FIG. 5 for adjusting the effective size of a scan zone area according to embodiments of the present disclosure.

FIG. 10 is a functional block diagram illustrating a computer program product configured to control a RFID-enabled SCO station according embodiments of the present disclosure.

DETAILED DESCRIPTION

Embodiments of the present disclosure provide a self-checkout (SCO) station enabled with Radio Frequency Identification (RFID) capability. According to the present disclosure, customers place a container (e.g., a basket) containing the products they wish to purchase on the surface of the RFID-enabled SCO station. Each product in the basket has an associated RFID tag containing information that uniquely identifies the product (e.g., an inventory identifier). So positioned, an RFID antenna in the RFID-enabled SCO station emits an RF interrogation signal that triggers each RFID tag to transmit its information to an RFID receiver at the RFID-enabled SCO station. Based on the received information, the RFID-enabled SCO station identifies the products in the container and outputs the identifying information, along with the cost of the products, to a display for the customers.

In addition to these functions, however, an RFID-enabled SCO station configured according to the present disclosure is specially configured to enhance security and reduce the occurrence of customer theft. Particularly, not all customers will place their selected products into the basket on the surface of the RFID-enabled SCO station to be identified. Rather, unscrupulous customers will purposefully keep a product away from the RFID-enabled SCO station so the RFID tag associated with the product cannot be triggered to send its information. Products having RFID tags that are not triggered by the RF interrogation signal are not included in the customer's purchase, and therefore, not included in the customer's payment.

The present embodiments address such situations, however, by configuring the RFID-enabled SCO station to selectively vary the effective size of an aperture (i.e., increase and decrease) through which the RF interrogation signals emitted by the RFID antenna pass before entering the scan zone area. This adjustment, in turn, dynamically increases and decreases the effective size of the area in which the RFID tags are able to be triggered by the RF interrogation signals, and thus, detected by the RFID-enabled SCO station.

Figure 1:
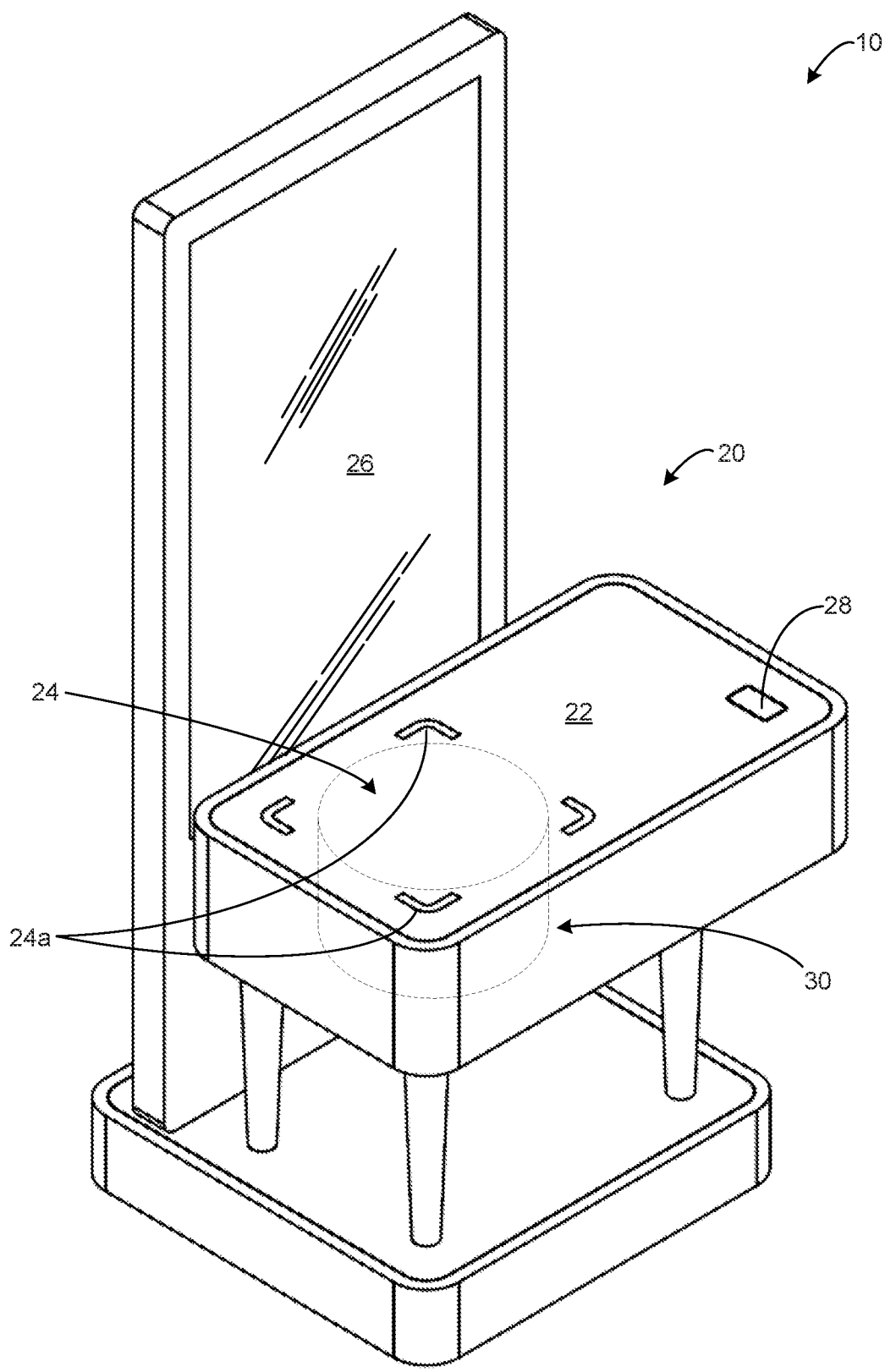
FIG. 1 is a perspective view of a Radio Frequency Identification (RFID) enabled self-checkout (SCO) station configured according to one embodiment of the present disclosure.

Turning now to the drawings, FIG. 1 illustrates a perspective view of an RFID-enabled SCO station 10 (hereinafter, referred to as "SCO station 10") configured according to one embodiment of the present disclosure. As seen in FIG. 1, SCO station 10 comprises a generally sealed enclosure 20 having a surface 22, a "scan zone" area 24, a display 26, a payment transaction region 28, and waveguide assembly 30 that includes, inter alia, an RFID antenna that emits RF energy (also referred to herein as "RF interrogation signals" or "RF signals") through an adjustable aperture and into the scan zone area 24.

In this embodiment, enclosure 20 comprises an enclosed table or cabinet, for example. Although not required, enclosure 20, which may be constructed from wood or metal, for example, is supported by multiple legs above an underlying raised platform resting on a supporting ground surface. In other embodiments, enclosure 20 may be supported by the legs that directly contact the ground surface. Regardless of the presence of an underlying support structure, however, the surface 22 of enclosure 20 is comprised of a material (e.g., tempered glass) that is pervious to the RF interrogation signals emitted by the RFID antenna of waveguide assembly 30.

The "scan zone" 24 is an area extending upwardly from surface 22. In this embodiment, a plurality of scan zone indicator markings 24a on surface 22 graphically indicate the boundaries of the scan zone 24 to a customer. The scan zone 24 is where the customer places the basket containing all the products he/she wants to purchase. Products for purchase are detected by the waveguide assembly 30 as they enter the scan zone 24 and are added to a customer's "buy cart" (i.e., a list of products being purchased by the customer). Information identifying each product and its cost is displayed to the customer on display 26, as is a running sum total for all detected products.

The waveguide assembly 30 also detects products that are removed from the scan zone area 24. In these cases, the information identifying the products and their associated costs are removed from the display 26 as well as from the customer's buy cart and the running total. In any case, the customer can place a payment vehicle such as a smartphone, a credit card, or a debit card, for example, in the payment transaction region 28 to pay for the products in the customer's buy cart.

Conventionally, RFID-enabled SCO stations confine the radiation pattern of the RFID antenna used to trigger the RFID tags on the products with a waveguide enclosure having an aperture. The sidewalls of the waveguide enclosure prevent the side lobes emitted by the RFID antenna from interacting with RFID tags that are outside of the scan zone 24. The aperture, on the other hand, is a fixed-size opening or through-hole in the waveguide enclosure through which the emitted RFID signals can pass. Usually, the aperture is positioned below the center of the scan zone 24 to allow the RF interrogation signals transmitted by the RFID antenna to enter the scan zone 24.

The size of the aperture defines the size of the radiation pattern of the RF interrogation signals transmitted by the RFID antenna, and as such, defines the size of scan zone 24 (i.e., the area in which the RFID tags on products can be triggered by the RF interrogation signals to send their information). Therefore, smaller apertures define smaller radiation patterns and smaller scan zones 24, while larger apertures define larger radiation patterns and larger scan zones 24. However, the fixed size of the apertures in conventional systems also fixes the sizes of both the radiation pattern emitted by the RFID antenna and the scan zone 24. That is, with conventional systems, the size of the radiation pattern and the scan zone 24 remains static and is not dynamically or selectively adjustable. The RFID-enabled SCO station 10 configured according to the present disclosure, however, is able to selectively and dynamically adjust the size of the aperture through which the RF interrogation signals transmitted by the RFID antenna pass. In doing so, the present embodiments adjust the effective size of the corresponding scan zone 24. Specifically, decreasing the size of the aperture also decreases the effective size of the scan zone 24 to allow for normal checkout procedures. Increasing the size of the aperture, however, increases the effective size of the scan zone 24 thereby increasing the chance that the RFID tags of any products a customer may try to hide from the RFID antenna are instead triggered by the RF interrogation signals. Moreover, the information read from the RFID tags of such "hidden" products is displayed on display 26 and added to the customer's buy cart.

Figure 2:
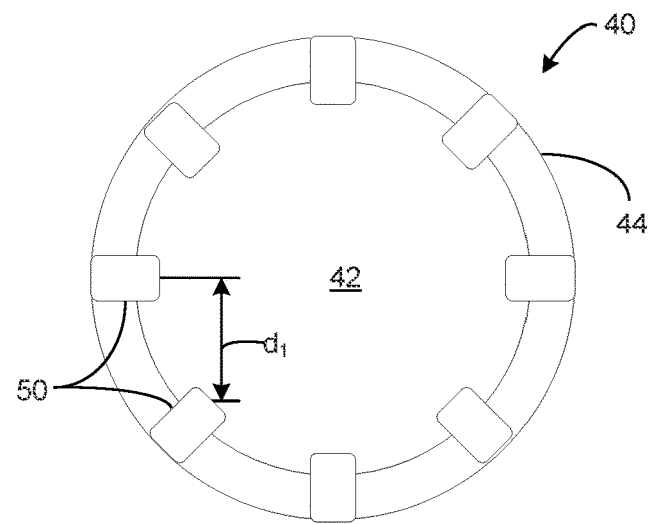
FIG. 2 illustrates exemplary aperture layers for adjusting the effective size of a scan zone area according to one embodiment of the present disclosure.
Figure 2:
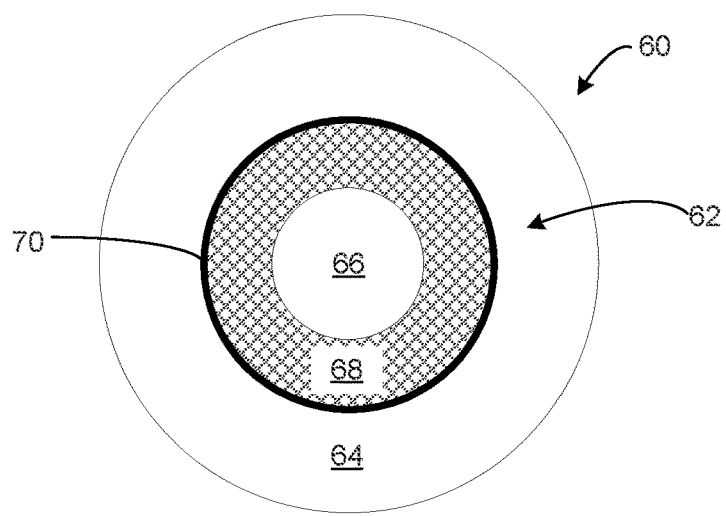
Figure 2:
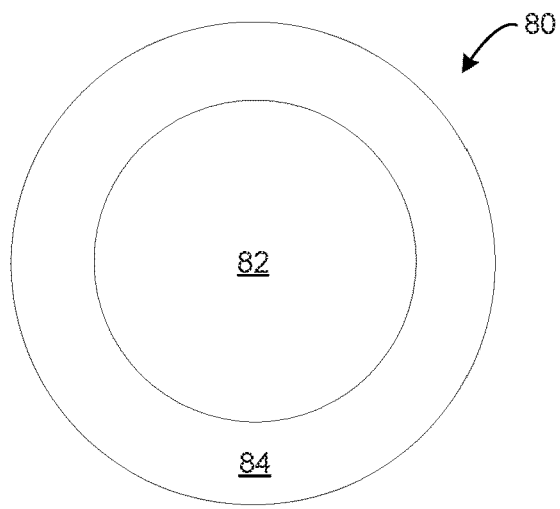

FIG. 2 illustrates exemplary aperture layers for adjusting the effective size of scan zone area 24 according to one embodiment of the present disclosure. Each aperture layer illustrated in FIG. 2 is manufactured from a thin layer of electrically conductive material (e.g., about 50 μm-70 μm (±5 μm) thick), such as copper, for example, and is part of an aperture assembly that forms the lid or top of waveguide assembly 30. As seen in FIG. 2, the aperture layers include a switch layer 40, a first aperture layer 60, and a ground layer 80. In this embodiment, each layer 40, 60, 70 is formed as a disc. However, those of ordinary skill in the art will readily appreciate that this is for illustrative purposes only. According to the present disclosure, one or more of the layers 40, 60, 80 may be any size and/or shape that is needed or desired.

Switch layer 40 comprises a central opening 42 and an outer region 44 surrounding the periphery of central opening 42. In this embodiment, outer region 44 is configured to carry one or more switches 50 (e.g., relays). Each switch 50 is configured to selectively connect/isolate the first aperture layer 60 to/from a ground circuit (e.g., an antenna ground), and is separated from immediately neighboring switches 50 by a distance of $d_1$. In this embodiment, distance $d_1$ is equal to ¼ λ (or multiple thereof) of the transmitting frequency of the RF antenna. However, this is for illustrative purposes only and switches 50 may be separated by any distance needed or desired.

According to the present embodiments, each switch 50 is dynamically and selectively controlled to open and close. When open, switches 50 electrically isolate the first aperture layer 60 from ground (e.g., a ground circuit). When closed, switches 50 electrically connect the first aperture layer 60 to ground. As described in more detail later, this selective opening and closing of switches 50 dynamically and selectively increases and decreases the size of variable aperture 62, thereby increasing and decreasing the effective size of scan zone 24.

The first aperture layer 60 has a variable aperture 62 and an outer region 64 surrounding the outer periphery of the variable aperture 62. Additionally, the variable aperture 62 comprises a central opening 66 and an RF shutter region 68 surrounding the outer periphery of the central opening 66. A non-conductive etch or gap 70 surrounds the outer periphery of outer region 64 and electrically isolates the outer region 64 from the RF shutter region 68. Although not required, this embodiment of the present disclosure shows each of the central opening 66, the RF shutter region 68, the non-conductive etch 70, and the outer region 64 all forming progressively larger concentric circles.

According to the present disclosure, first aperture layer 60 operates as a waveguide for directing the RF energy (e.g., the RF interrogation signals) emitted by the RFID antenna into scan zone 24. To accomplish this, the present embodiments selectively control switches 50 such that the RF shutter region 68 will either be pervious or impervious to the RF interrogation signals being transmitted by the RFID antenna. For example, in one embodiment, RF shutter region 68 is configured to be electrically connected to, or electrically isolated from, a ground circuit via switches 50. When RF shutter region 68 is electrically connected to ground (i.e., when switches 50 are closed), RF shutter region 68 becomes substantially impervious to the RF interrogation signals transmitted by the RFID antenna disposed in waveguide assembly 30. That is, when grounded, RF shutter region 68 prevents substantially all of the transmitted RF interrogation signals from passing through it and into scan zone 24. However, when RF shutter region 68 is electrically isolated from the ground circuit (i.e., when switches 50 are open), RF shutter region 68 becomes substantially pervious to the RF interrogation signals transmitted by the RFID antenna disposed in waveguide assembly 30. That is, when isolated from ground, RF shutter region 68 allows substantially all of the transmitted RF interrogation signals to pass through it and into scan zone 24.

The central opening 66 is a through-hole formed in first aperture layer 60 and is always pervious to the transmitted RF interrogation signals. Thus, the RF interrogation signals emitted by the RFID antenna in waveguide assembly 30 always pass through central opening 66 and into scan zone 24 regardless of whether any part of first aperture layer 60 is grounded.

Therefore, by electrically connecting the RF shutter region 68 to ground, the present embodiments decrease/constrain the radiation pattern of the transmitted RF interrogation signals. This decreases/constrains the effective size of the scan zone 24 to be substantially the same size as the area bounded by the indicators 24a on surface 22. By electrically isolating the RF shutter region 68 from ground, however, the present embodiments increase the radiation pattern of the transmitted RF interrogation signals. This increases the effective size of scan zone 24 to be larger than the area bounded by the indicators 24a on surface 22. In one embodiment, for example, electrically isolating the RF shutter region 68 from ground increases the effective size of the scan zone 24 such that RFID tags associated with products about 3-4 feet away from enclosure 20 can still be triggered by the RF interrogation signals emitted by the RFID antenna.

Ground layer 80 comprises a central opening 82 and an outer region 84 surrounding the periphery of central opening 82. In this embodiment, central opening 82 is a fixed-size aperture having a diameter that is larger than the diameter of central opening 66 and RF shutter region 68. Additionally, as described in more detail below, ground layer 80 is always electrically connected to ground.

Figure 3:
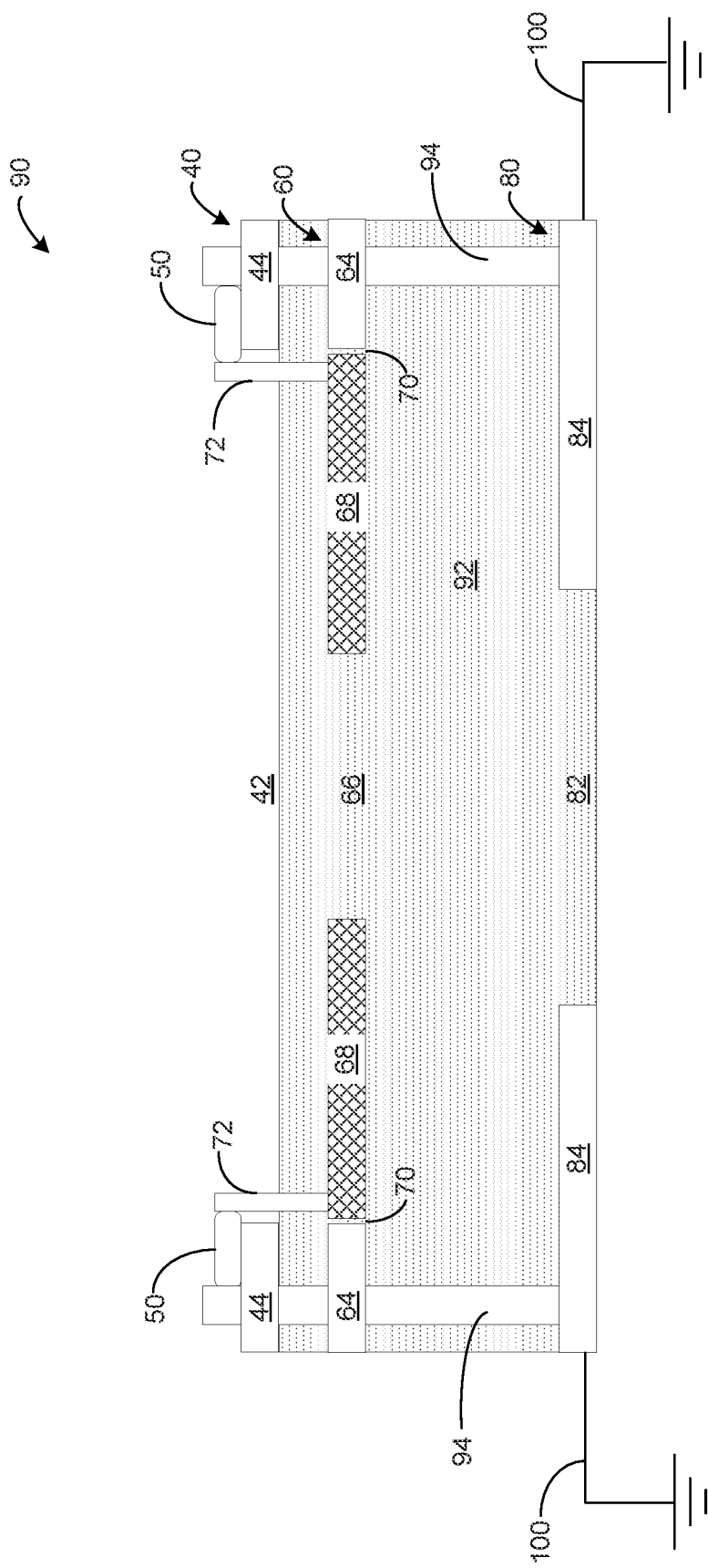
FIG. 3 illustrates an aperture assembly including the aperture layers of FIG. 2 for adjusting the effective size of a scan zone area according to one embodiment of the present disclosure.

FIG. 3 illustrates an aperture assembly 90 configured according to one embodiment of the present disclosure to include the exemplary layers 40, 60, 80 seen in FIG. 2. In exemplary embodiments, aperture assembly 90 is a unitary structure and is mechanically mated with waveguide assembly 30 (e.g., using bolts or screws). Additionally, based on the physical shape of waveguide assembly 30, aperture assembly 90 is sized and shaped to span the width or diameter of waveguide assembly 30. Thus, according to the present embodiments, aperture assembly 90 is configured to mate with waveguide assembly 30 as the lid or top of waveguide assembly 30. When mated with aperture assembly 90, waveguide assembly 30 comprises a sealed enclosure commonly referred to as a "can."

As seen in FIG. 3, the aperture assembly 90 includes a body 92, a switch layer 40, a first aperture layer 60, and a ground layer 80. In one embodiment, aperture assembly 90 comprises one or more Printed Circuit Boards (PCBs) constructed, for example, from one or more layers of an RF transparent material, such as FR4. As is known in the art, FR4 comprises a woven fiberglass cloth with a flame-resistant epoxy resin binder and is commonly used as a base material in the manufacture of PCBs. In one embodiment, aperture assembly 90 is about 1.6 mm (±10%) thick; however, as those skilled in the art will appreciate, the size, shape, and dimensions of aperture assembly 90 and waveguide assembly 30 can be any needed or desired.

A ground trace 94 extends through body 92 and is electrically connected to the outer region 84 of ground layer 80, as well as to ground circuit 100. Additionally, ground trace 94, and thus, ground layer 80, is electrically connected to the housing of waveguide assembly 30, which is also electrically connected to ground. In this embodiment, both ground layer 80 and ground circuit 100 function as a common ground for an RFID antenna in waveguide assembly 30. Additionally, switches 50 are also electrically connected to the ground trace 94. Thus, as described in more detail later, closing switch 50 will enable the connection of a PCB layer, such as first aperture layer 60, to the common antenna ground, while opening switches 50 will isolate first aperture layer 60 from the common antenna ground.

To accomplish this, the present embodiments attach a conductive grounding element 72 to a surface of the RF shutter region 68. Grounding element 72 extends vertically from RF shutter region 68 and into electrical contact with one of the switches 50. In operation, a processing circuit, such as a controller, for example, generates one or more control signals to control the switches 50 to open and close. When closed, switches 50 electrically connect the grounding element 72, and thus, the RF shutter region 68, to ground layer 80 and ground circuit 100 via ground element 94. In this position, RF shutter region 68 is considered to be grounded. When open, however, switches 50 electrically isolate the grounding element 72, and thus, RF shutter region 68, from ground layer 80 and ground circuit 100. In all cases, the non-conductive etch 70 electrically isolates the outer region 64 from the RF shutter region 68. Therefore, opening and closing switches 50 does not affect whether outer region 64 is electrically connected to, or electrically isolated from, ground circuit 100.

It should be noted here that the embodiment of FIG. 3 illustrates multiple grounding elements 72 connected to RF shutter region 68 and multiple switches 50 being carried by switch layer 40. Thus, in this embodiment, switches 50 are disposed around the circumference of outer region 44 at positions that correspond to the positions of respective grounding elements 72. However, this is merely for illustrative purposes. According to the present disclosure, only a single grounding element 72 and a single switch 50 are required to effect the electrical connection and isolation of the first aperture layer 60 to and from ground trace 94 and ground circuit 100.

Regardless of the particular number and/or configuration of switches 50, however, aperture assembly 90 is constructed such that RFID interrogation signals emitted by an RFID antenna disposed inside of waveguide assembly 30 pass through body 92 and central openings 82, 66, and 42 into scan zone 24.

The structure of aperture assembly 90 provides benefits that other such systems cannot or do not provide. For example, some existing systems require one or more motors to move various aperture layers into and out of corresponding positions, thereby modifying the size of a transmitted RFID field. With the present embodiments, however, none of the layers 40, 60, and 80 are moved into and out of various positions. Instead, as described above, one or more selected layers (e.g., first aperture layer 60) are dynamically electrically connected to, and dynamically electrically isolated from, ground circuit 100 using one or more controlled switches 50. Therefore, layers 40, 60, 80 are static and no motors or other means for effecting the physical displacement of any of layers 40, 60, 80 are needed with the present embodiments. Not only does this reduce the cost of manufacturing aperture assembly 90, and thus, SCO station 10 in general, but it also simplifies the configuration of a controller (e.g., a processing circuit) for controlling aperture assembly 90 and the RFID-enabled SCO station 10.

Figure 4:
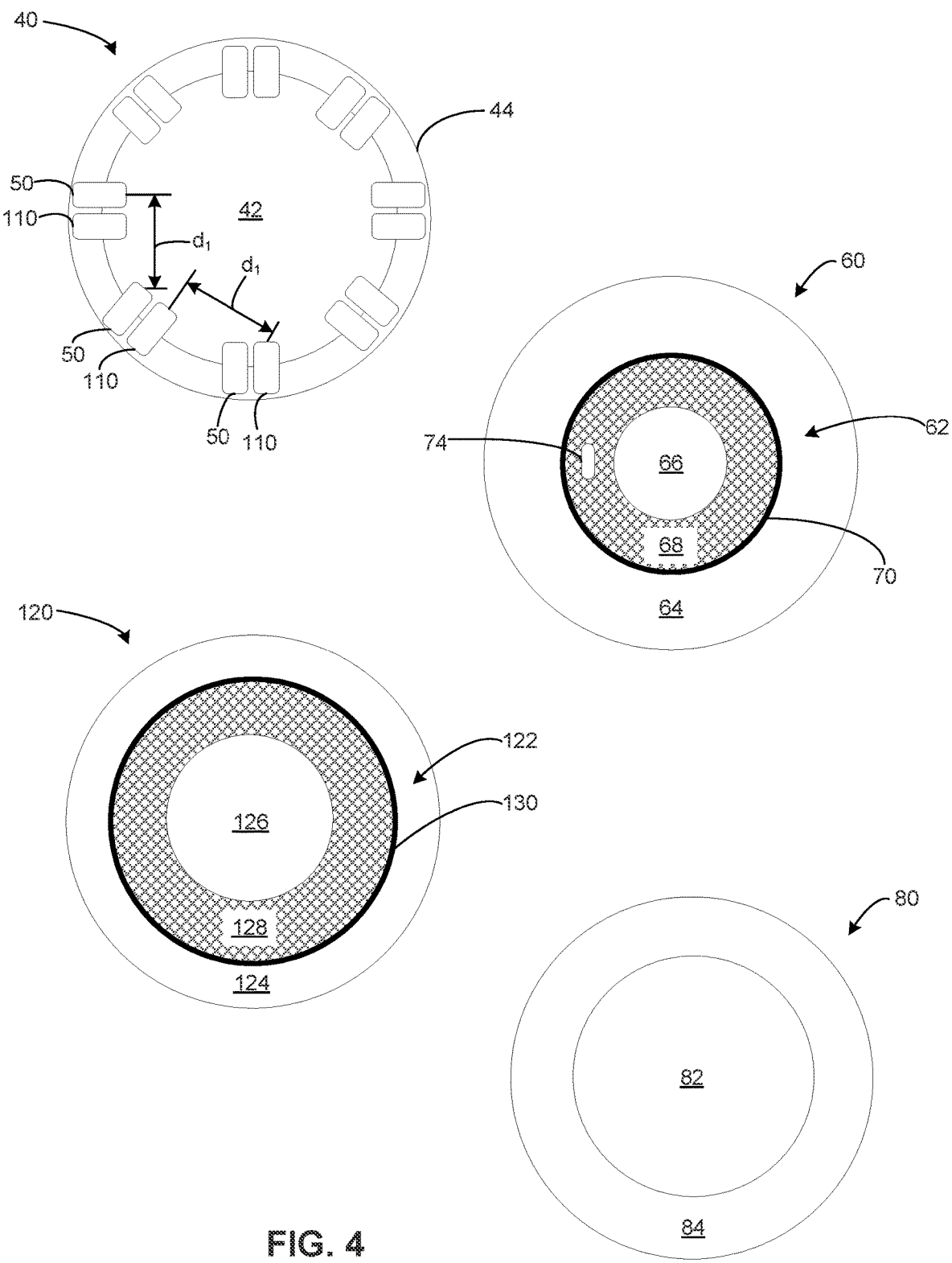
FIG. 4 illustrates exemplary aperture layers for adjusting a scan zone area according to another embodiment of the present disclosure.

FIG. 4 illustrates an embodiment of the present disclosure in which multiple aperture layers are used for adjusting the effective size of scan zone 24. In particular, this embodiment of the present disclosure comprises switch layer 40, first aperture layer 60, and ground layer 80. Additionally, although the structure of ground layer 80 remains unchanged from the previous embodiment, this embodiment of the present disclosure modifies the switch and first aperture layers 40, 60, and adds a second aperture layer 120. As seen in more detail later, each of the layers 40, 60, 80, and 120 are comprised in the PCB structure of aperture assembly 90.

In more detail, the switch layer 40, first aperture layer 60, and ground layer 80 are structured as previously described. However, in this embodiment, switch layer 40 is configured to carry an additional set of one or more switches 110 (e.g., relays) in addition to the set of switches 50. As seen in FIG. 4, switches 50, 110 are arranged along the circumference of outer region 44 in pairs. Thus, each switch 50 is paired with a switch 110. Further, each switch 50 is separated from each neighboring switch 50 by a distance of $d_1$. Similarly, each switch 110 is separated from each neighboring switch 110 by a distance of $d_1$. As illustrated later, switches 50, 110 are configured to electrically connect and isolate respective aperture layers 60, 120 to and from ground circuit 100.

It should be noted that both the number and arrangement of switches 50, 110 shown herein are for illustrative purposes only. Those of ordinary skill in the art will appreciate that in at least one embodiment of the present disclosure, only a single switch 50 and a single switch 110 is carried by switch layer 40. Further, the switches 50, 110 need not be paired as illustrated in the figure. Rather, switches 50, 110 may be arranged along outer region 44 in any manner needed or desired.

The first aperture layer 60 is also structured as previously described. However, in this embodiment, first aperture layer 60 also comprises one or more openings 74 formed as through holes in RF shutter region 68. As seen in more detail later, each opening 74 is configured to facilitate the electrical connection of the second aperture layer 120 to ground circuit 100.

Regarding the second aperture layer 120, it is constructed of the same or similar material (e.g., a metal or metal alloy) that is used to construct the first aperture layer 60. As shown in FIG. 4, the second aperture layer 120 is like first aperture layer 60 in that it comprises an outer region 124 surrounding the outer periphery of a variable aperture 122. Additionally, variable aperture 122 comprises an RF shutter region 128 surrounding the outer periphery of a central opening 126. A non-conductive etch 130 electrically isolates the RF shutter region 128 of variable aperture 122 from the outer region 124.

Like the first aperture layer 60, the second aperture layer 120 operates as a waveguide for directing the RF interrogation signals emitted by the RFID antenna into scan zone 24. Thus, according to the present disclosure, this embodiment selectively controls RF shutter region 128 to be either pervious or impervious to the RF interrogation signals. This is in addition to controlling RF shutter region 68 of the first aperture layer 60 as previously described.

For example, in one embodiment, the present disclosure selectively and dynamically controls switches 110 to electrically connect RF shutter region 128 to, and electrically isolate RF shutter region 128 from, ground circuit 100. When RF shutter region 128 is electrically connected to ground circuit 100 (i.e., when switches 110 are closed), RF shutter region 128 becomes substantially impervious to the RF interrogation signals transmitted by the RFID antenna disposed in waveguide assembly 30. That is, when grounded, RF shutter region 128 prevents substantially all of the transmitted RF interrogation signals from passing through it and into scan zone 24. However, when RF shutter region 128 is electrically isolated from ground circuit 100 (i.e., when switches 110 are open), RF shutter region 128 becomes substantially pervious to the RF interrogation signals transmitted by the RFID antenna disposed in waveguide assembly 30. That is, when isolated from ground, RF shutter region 128 allows substantially all of the transmitted RF interrogation signals to pass through it and into scan zone 24.

The central opening 126 is a through-hole formed second aperture layer 120. Thus, the RF interrogation signals emitted by the RFID antenna in waveguide assembly 30 always pass through central opening 126 and into scan zone 24 regardless of whether any part of the second aperture layer 120 (or the first aperture 60) is grounded. Further, in this embodiment, the diameter of central opening 126 is larger than the diameter of the central opening 66 of the first aperture layer 60. Similarly, the diameter of variable aperture 122 is larger than the diameter of variable aperture 62.

Figure 5:
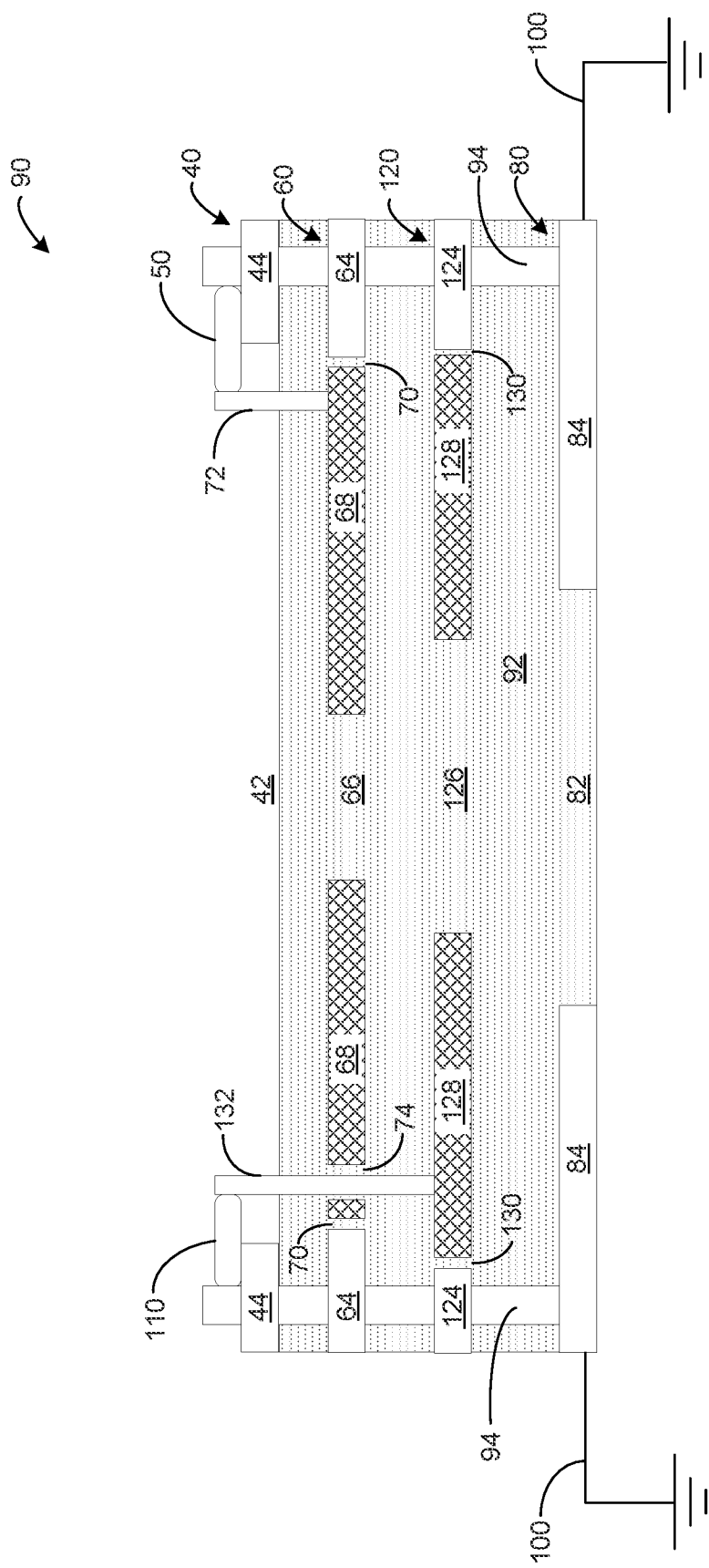
FIG. 5 illustrates an aperture assembly including the aperture layers of FIG. 4 for adjusting the effective size of a scan zone area according to one embodiment of the present disclosure.

FIG. 5 illustrates aperture assembly 90 configured to include layers 40, 60, 80, and 120 shown in FIG. 4. As with the previously described embodiments, aperture assembly 90 shown in FIG. 5 is connected to, and forms the lid of, waveguide assembly 30.

As seen in FIG. 5, aperture assembly 90 comprises body 92, switch layer 40, first aperture layer 60, second aperture layer 120, and ground layer 80. Each of the body 92 and ground trace 94 are the same structurally and functionally as described in the previous embodiments, and therefore, are not described further.

In this embodiment, grounding element 72 is attached to the surface of RF shutter region 68 and extends vertically into electrical contact with one of the switches 50 carried on switch layer 40. Similarly, a conductive grounding element 132 attached to the surface of RF region 128 of second aperture layer 120 extends vertically through opening 74 in first aperture layer 60 and into electrical contact with one of the switches 110.

In operation, a processing circuit (seen later in FIG. 9) generates a first set of one or more control signals to control the switches 50 to open and close. When closed, switch 50 electrically connects the grounding element 72 and RF shutter region 68 of first aperture layer 60 to ground circuit 100 via ground trace 94. As stated above, this electrical connection decreases the effective size of variable aperture 62 to be that of central opening 66, thereby constraining the radiation pattern of RF interrogation signals transmitted by an RFID antenna to the size of the central opening 66. This, in turn, decreases/constrains the effective size of scan zone 24 to be substantially the same size as the area bounded by the indicators 24a on surface 22. When open, switch 50 electrically isolates grounding element 72 and RF shutter region 68 from both ground circuit 100 and ground trace 94 thereby increasing the effective size of variable aperture 62 to be that of RF shutter region 68. Increasing the effective size of variable aperture 62 in this manner increases the size of the radiation pattern of the transmitted RF interrogation signals. As a result, the effective size of scan zone 24 is increased to extend beyond (i.e., be larger than) the area bounded by the indicators 24a on surface 22.

Similarly, the processing circuit also generates a second set of one or more control signals to control switches 110 to open and close. When closed, each switch 110 electrically connects a corresponding grounding element 132 and RF shutter region 128 of second aperture 120 to ground circuit 100 via ground trace 94. As above, this decreases the effective size of variable aperture 122 to be that of central opening 126, and therefore, constrains the radiation pattern of RF interrogation signals transmitted by an RFID antenna to the size of the central opening 126. This, in turn, decreases/constrains the effective size of scan zone 24 to be substantially the same size as the area bounded by the indicators 24a on surface 22. When open, switch 110 electrically isolates grounding element 132 and RF shutter region 128 from ground circuit 100 and ground trace 94. According to the present embodiments, this electrical isolation increases the effective size of variable aperture 122, and thus, increases the size of the radiation pattern of the transmitted RF interrogation signals. Accordingly, the effective size of scan zone 24 can be increased to extend beyond (i.e., be larger than) the area bounded by the indicators 24a on surface 22.

As in the previous embodiments, the embodiment of FIG. 5 does not require movement of any of the layers 40, 60, 80, 120. Rather, each layer 40, 60, 80, 120 remains stationary, and the present embodiments selectively control switches 50 and/or 110 to open and close, thereby increasing and decreasing the effective size of variable aperture(s) 62 and/or 122, and as such, the effective size of scan zone 24.

FIGS. 6A-6D illustrate a cross-section of a waveguide assembly 30 configured to include aperture assembly 90 according to the present embodiments. As seen in these figures, waveguide assembly 30 comprises a housing 32 that forms an interior cavity 34, an RFID antenna 140 disposed in cavity 34 (i.e., on the interior of the waveguide assembly 30), and an aperture assembly 90 that includes layers 40, 60, 120, and 80. According to the present disclosure, the distance $d_2$ between aperture layers 60, 120 is equivalent to a ¼ λ based interval measured between center lines of the two layers 60, 120. In the embodiments shown in FIGS. 6A-6D, the distance $d_2$ is equal to about 0.2 mm-1 mm. This exemplary distance is less than 1% of a ¼ λ of the RF interrogation signal transmitted by the RFID antenna 140 making that distance negligible.

According to the present disclosure, the separation (i.e., distance) between two layers (e.g., layers 60, 120) of aperture assembly 90 is not problematic so long as the maximum distance $d_{max}$ between the two layers does not exceed 2% of a ¼ λ of the transmitted RF interrogation signal. In cases where the distance $d_2$ between two layers cannot be within $d_{max}$, then the layers should be arranged in the aperture assembly 90 such that the distance $d_2$ separating them is at or near the next multiple ¼ λ.

In general, the maximum distance $d_{max}$ can be calculated as:

$$d_{max} = \frac{1}{4}\lambda \times (n-1) \times 2 \pm \frac{1}{4}\lambda \times .02$$

where:
  λ is the speed of light c divided by the frequency f at which RFID antenna 140 transmits the RF interrogation signals (i.e., λ=c/f); and
  n is an integer >0 and defines the number of wavelengths used in the configuration of waveguide assembly 30.

By way of example only, consider an RFID antenna 140 that emits RF interrogation signals at a frequency of 430 MHz. Given this frequency, $d_{max}$ is about 3.5 mm. As stated above, the actual distance $d_2$ between layers 60, 120 in FIGS. 6A-6D is about 0.2 mm-1 mm, which is well below the 3.5 mm calculated for $d_{max}$. Thus, while not required, aperture assembly 90 is compact.

Figure 7:
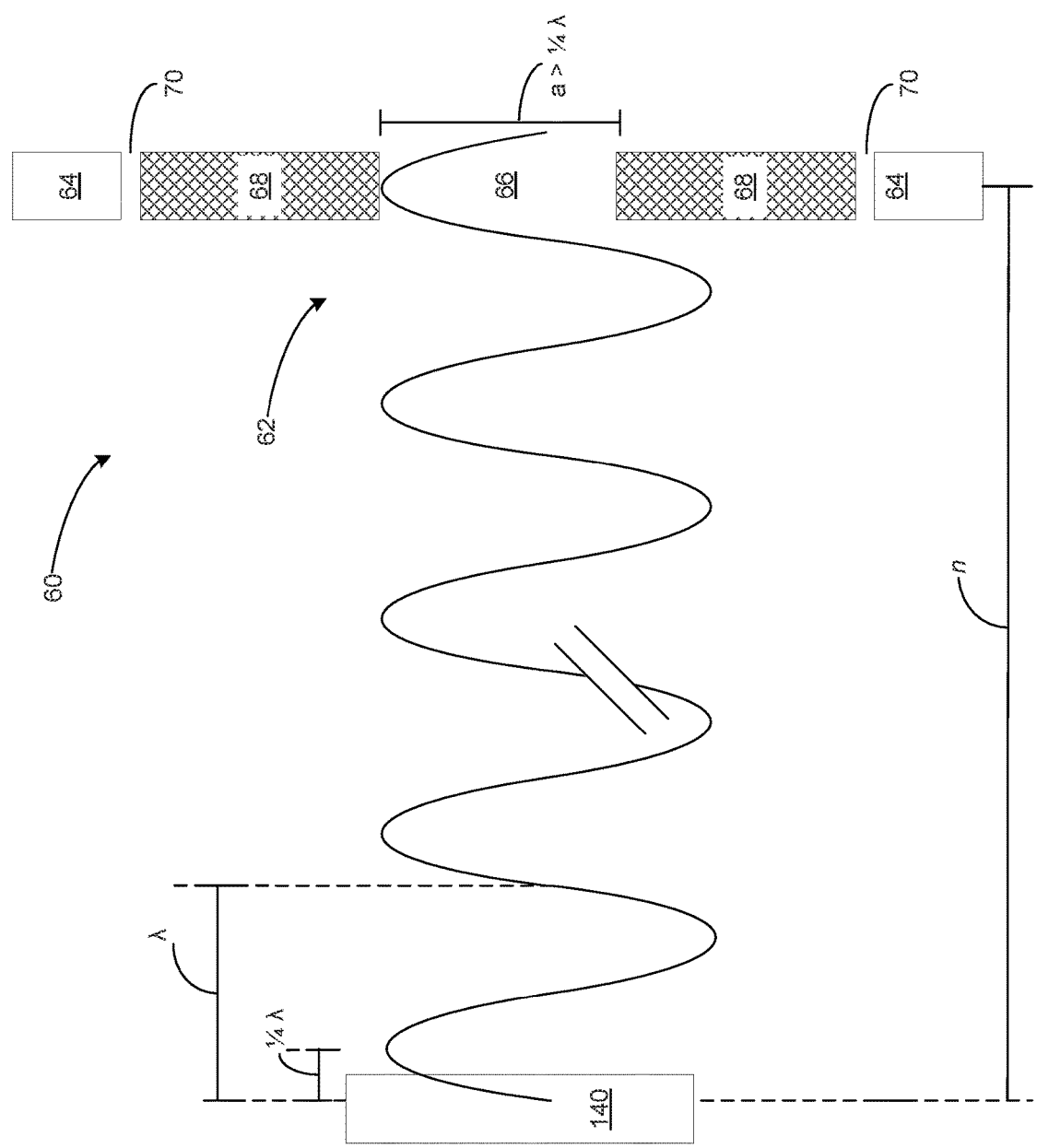
FIG. 7 illustrates transmission of an RF interrogation signal through an exemplary aperture layer according to one embodiment of the present disclosure.

As previously described, aperture assembly 90 is mated to the waveguide assembly 30 as the lid of waveguide assembly 30. This forms waveguide assembly 30 into a sealed enclosure. Additionally, in this embodiment, first aperture layer 60 is separated from the RFID antenna 140 by a distance $d_3$ of $$2 \times (n-1) \times \frac{1}{4}\lambda,$$

wherein, as seen in FIG. 7, for example:
  λ is the speed of light c divided by the frequency f at which RFID antenna 140 transmits the RF interrogation signals (i.e., λ=c/f); and
  n is an integer >0 and defines the number of wavelengths used in the configuration of waveguide assembly 30.

As seen in FIG. 7, the diameter a of central opening 66, in this embodiment, is greater than ¼ λ.

Those of ordinary skill in the art should appreciate that the distances described herein are for illustrative purposes only and may vary based on implementation. For example, in the embodiments of FIGS. 6A-6D, distance $d_3$ shows a distance between the center of RFID antenna 140 and the center of first aperture layer 60. Other embodiments, however, may have a different distance $d_3$. This is because the present disclosure calls for measuring the distance $d_3$ between the center of RFID antenna 140 and a center of the stack of layers 40, 60, 120, 80 of aperture assembly 90. In the embodiments seen of FIGS. 6A-6D, the center of the stack of layers 40, 60, 120, 80 is the center of first aperture layer 60; however, as stated above, this is for illustrative purposes only. Other distances for $d_3$ can exist based, for example, on the number of layers and/or the size of the PCB used in constructing aperture assembly 90.

The RFID antenna 140 is circular polarized antenna disposed within the cavity 34, and in this embodiment, is configured to transmit RFID energy (e.g., the previously described RF interrogation signals) at a frequency of 433 MHz and/or 860-960 MHz. The sidewalls of housing 32, which is electrically connected to ground, are constructed of a material that prevents the RF interrogation signals transmitted by the RFID antenna 140 from exiting the sides and bottom of waveguide assembly 30. For example, in one embodiment, the sidewalls of housing 32 are constructed from the same or similar metal or metal alloy used to construct first and second aperture layers 60, 120 and reflect the transmitted RF energy towards aperture assembly 90 and scan zone 24

As previously described, switches 50, 110 are electrically connected to ground element 94, which in turn, is electrically connected to ground circuit 100. Switches 50, 110 are selectively and dynamically controllable to electrically connect and electrically isolate their respective first and second aperture layers 60, 120 to and from ground circuit 100 via ground trace 94, as previously described.

Particularly, FIG. 6A illustrates an embodiment in which switch 50 is closed and switch 110 is open. Thus, first aperture layer 60 is electrically connected to ground circuit 100 and second aperture layer 120 is electrically isolated from ground circuit 100. In this configuration, the RF interrogation signals transmitted by RFID antenna 140 (i.e., RF signals 142) pass through central opening 46 and into scan zone 24, thereby allowing customers to scan their products during checkout. However, some of the transmitted RF interrogation signals (i.e., RFID signals 144) are blocked by RF shutter region 68 from passing through first aperture layer 60 and into scan zone 24. Because second aperture layer 120 is isolated from the ground circuit 100 by switch 110, the RF interrogation signals transmitted by RFID antenna 140 pass through central opening 126 and RF shutter region 128.

Figure 6B:
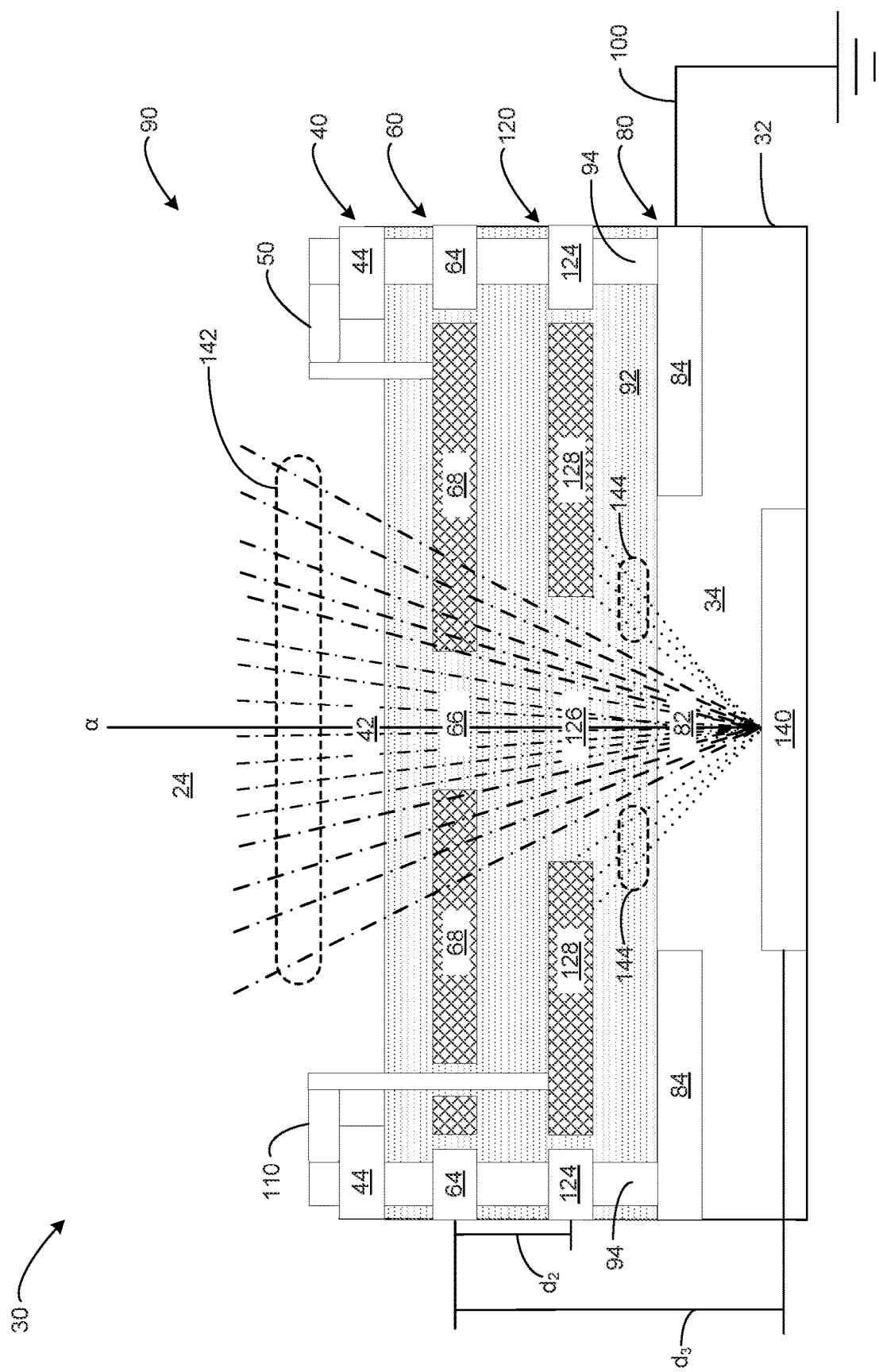

FIG. 6B illustrates an embodiment in which switch 50 is open electrically isolating first aperture layer 60 from ground circuit 100, and switch 110 is closed electrically connecting second aperture layer 120 to ground circuit 100. In this configuration, the RF shutter region 68 is pervious to the RF interrogation signals transmitted by RFID antenna 140. Thus, the transmitted RF signals 142 pass through central opening 126, central opening 66, and RF shutter region 68 into scan zone 24. However, because second aperture layer 120 is electrically isolated from ground circuit 100, RF shutter region 128 blocks the RF interrogation signals (i.e., RF signals 144) from propagating towards the first aperture layer 60.

Figure 6C:
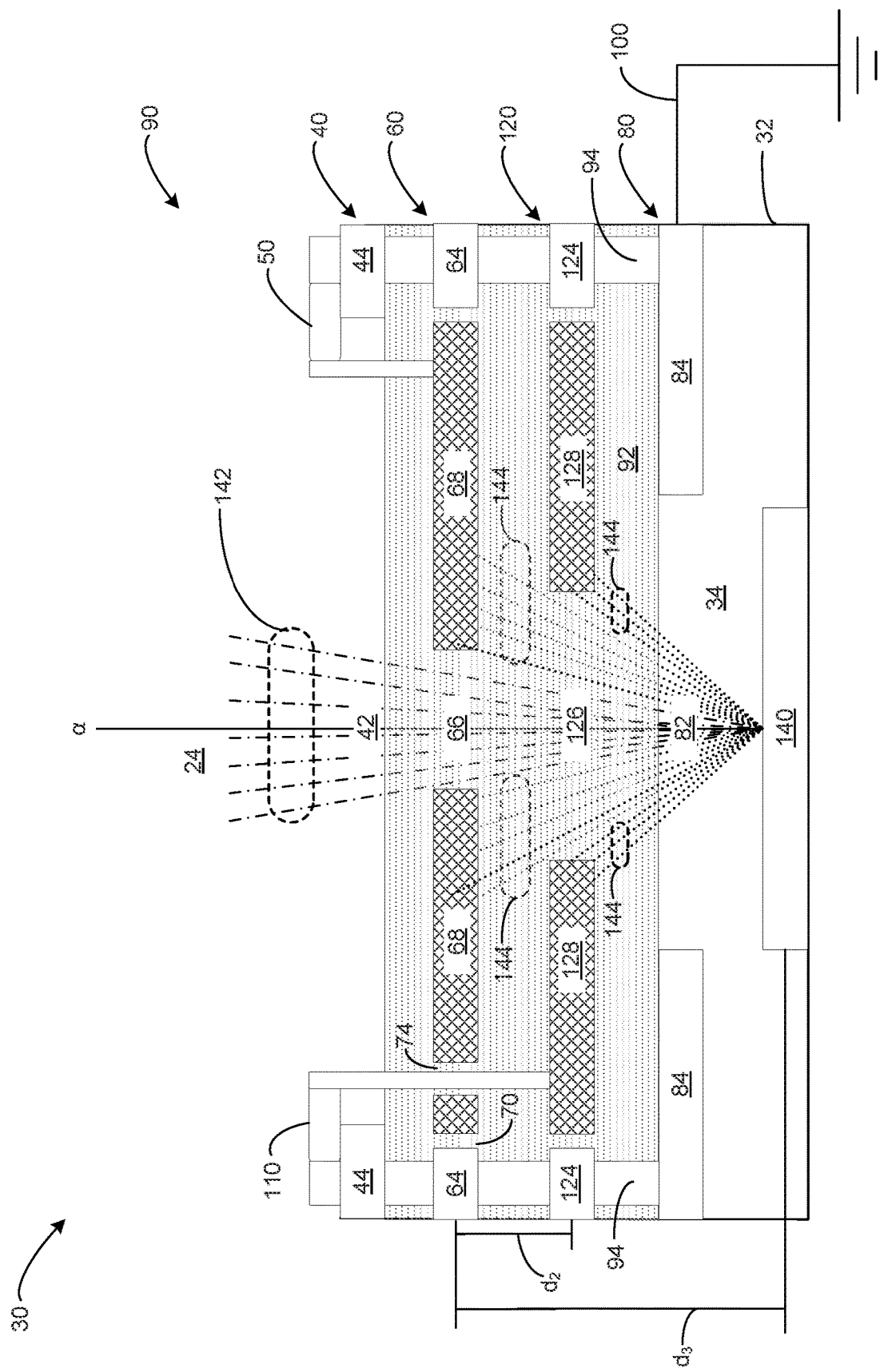

FIG. 6C illustrates an embodiment in which switches 50 and 110 are both closed, thereby electrically connecting both the first and second aperture layers 60, 120 to ground circuit 100. In this case, both RF shutter regions 68, 128 prevent the RF interrogation signals (i.e., RF signals 144) transmitted by RFID antenna 140 from passing through to scan zone 24. However, the RF interrogation signals (i.e., RF signals 142) still pass through the central openings 126, 66 and into scan zone 24.

FIG. 6D illustrates an embodiment in which switches 50 and 110 are both open, thereby electrically isolating both the first and second aperture layers 60, 120 from ground circuit 100. In such situations, both RF shutter regions 68, 128 are pervious to the RF interrogation signals (i.e., RF signals 142) transmitted by RFID antenna 140. Thus, those signals pass through RF shutter regions 128, 68, as well as through central openings 126, 66, into scan zone 24.

Increasing and decreasing the effective size of the scan zone 24 by electrically connecting and disconnecting first and/or second aperture layers 60, 120 to and from ground circuit 100 provides benefits that conventional SCO systems cannot or do not provide. For example, as stated above, an SCO station 10 configured according to the present embodiments enhances security and helps prevent fraud by customers. Consider, for example, a customer who does not want to pay for a given article of clothing. In these situations, the customer may try to wear the article of clothing while checking out at SCO station 10 rather than place the article of clothing into the scan zone 24. Because the sizes of the scan zones 24 of conventional SCO systems are static and do not have a variable aperture 62 and/or 122, the radiation pattern of the transmitted RF interrogation signals is also constrained. Thus, the RF interrogation signals entering the scan zone 24 may not trigger the RFID tags attached to the clothing. However, electrically isolating aperture layers 60, 120 from ground circuit 100 increases the radiation pattern of the transmitted RF interrogation signals by allowing the transmitted RF interrogation signals to pass through a larger area of aperture layers 60, 120 (i.e., RF shutter regions 68, 128). This increases both the radiation pattern of RFID antenna 140 and the effective size of scan zone 24. As a result, the transmitted RF interrogation signals (i.e., RFID signals 142) are able to trigger the RFID tags of products that are not directly within the indicators 24a marking the boundaries of scan zone 24, but rather, are proximate those indicators 24a. In one embodiment, for example electrically isolating aperture layers 60 and 120 from the ground circuit 100 increases the area of scan zone 24 such that RFID tags on a product can be triggered at a distance of about three (3) feet away from the sides of enclosure 20.

Those of ordinary skill in the art should appreciate that the size of variable apertures 62 and/or 122 can be any size needed or desired. In one embodiment, however, opening 66 is 4-inches in diameter and RF shutter region 68 is 5.5-inches in diameter. When the RF shutter region 68 is electrically grounded to ground circuit 100, the 4-inch diameter opening 66 limits the size of the RFID antenna field such that only the RFID tags attached to products in a buy zone are triggered. However, when the RF shutter region 68 is electrically isolated from ground circuit 100, the effective size of opening 68 is increased to 5.5-inches in diameter such that the transmitted RF interrogation signals of RFID antenna field trigger the RFID tags of products that are up to 3-feet outside of the buy zone.

According to the present embodiments, there are a variety of ways to control switches 50, 110 to open and close selectively and dynamically. For example, in one embodiment, the connection and disconnection of first aperture layer 60 via switch 50 is controlled by a timer. In this embodiment, SCO station 10 is configured to enter a "buy mode" of operation when a customer initiates checkout (e.g., when the customer places a container comprising his/her selected products in scan zone 24 on the surface 22 of enclosure 20). In the buy mode, RFID antenna 140 emits RF interrogation signals to trigger the RFID tags attached to the selected products, as previously described. Additionally, first aperture layer 60 would be actively configured to electrically connect to ground circuit 100 (e.g., by controlling switch 50 to close). So configured, the RF interrogation signals transmitted by RFID antenna 140 (e.g., RFID signals 142 of FIGS. 6A-6D) pass through the central opening 66 and into scan zone 24. However, the electrical connection also causes the RF shutter region 68 of variable aperture 62 to become substantially impervious to the RF interrogation signals, thereby preventing the RF interrogation signals (e.g., RFID signals 144 of FIG. 6A) transmitted by RFID antenna 140 from entering the scan zone 24. Thus, in the buy mode of operation, the radiation pattern of the transmitted RF interrogation signals is confined by the central opening 66, which limits the size of scan zone 24 to an area substantially defined by the indicators 24a on surface 22 of enclosure 20.

When the timer expires, however, SCO station 10 is configured to automatically enter an "audit mode" of operation. In the audit mode, RFID antenna 140 would still emit the RF interrogation signals, but first aperture layer 60 would be actively isolated from ground circuit 100 (e.g., by controlling switch 50 to open). Isolating aperture layer 60 from ground circuit 100 causes the RF shutter region 68 of variable aperture 62 to become substantially pervious to the RF interrogation signals. This allows the RF interrogation signals (e.g., RFID signals 144 of FIG. 6B) transmitted by RFID antenna 140 to pass through both the central opening 66 and the RF shutter region 68, thereby increasing the size of the radiation pattern of transmitted RFID signals. This, in turn, increases the size of scan zone 24 to allow the RF interrogation signals transmitted by RFID antenna 140 to trigger products positioned outside of scan zone 24. When the audit mode is complete, which may be dictated by another timer, for example, SCO station 10 would re-enter the buy mode of operation by electrically controlling switch 50 to close, thereby once again electrically connecting aperture layer 60 to ground circuit 100, as previously described.

Thus, the timer(s) of this embodiment configure the aperture layer 60 such that the size of scan zone 24 is selectively and dynamically increased and decreased. However, the present disclosure is not limited solely to the use of timers to control the electrical connection and isolation of aperture layer 60 to ground circuit 100. In another embodiment, for example, SCO station 10 is configured to selectively switch between operational modes responsive to detecting one or more predetermined events. By way of example only, SCO station 10 may be configured with one or more proximity sensors to detect when customers approach SCO station 10. Responsive to detecting a customer, SCO station 10 automatically enters the buy mode of operation by electrically connecting aperture layer 60 to ground circuit 100. In this mode, as stated above, the customer can place his/her container into scan zone 24 so that the products in the container can be identified. Then, responsive to detecting a subsequent, different predetermined event (e.g., detecting that the RFID tags of all the products in the container have been read and/or that the customer is ready to pay for the products), SCO station 10 automatically enters the audit mode of operation by electrically isolating aperture layer 60 from ground circuit 100. This increases the size of scan zone 24 such that the RFID tags of products positioned outside of the scan zone 24 defined in the buy mode of operation are triggered to send their information to SCO station 10. Upon receiving the information, SCO station 10 updates display 26 to show the customer the detected product(s) as well as provide the customer with an updated cost. In another embodiment, SCO station 10 is configured to automatically enter the audit mode of operation upon detecting the presence of a customer, and thereafter, automatically enter the buy mode of operation (e.g., after the expiration of a timer or responsive to detecting the customer placing a container of products on surface 22 of enclosure 20). In such embodiments, it is possible that SCO station 10 will detect one or more products in the customer's container prior to the customer placing the container onto the surface 22 of enclosure 20. In these cases, SCO station 10 is configured to automatically resolve the information received from the RFID tags in both the audit mode and the buy mode to prevent charging the customer for the same product twice. In other embodiments, SCO station 10 is configured to intermittently switch its mode of operation between the buy mode and the audit mode. In these embodiments, the time spent in the buy mode and/or the audit mode may be defined by one or more timers, for example.

Figure 8:
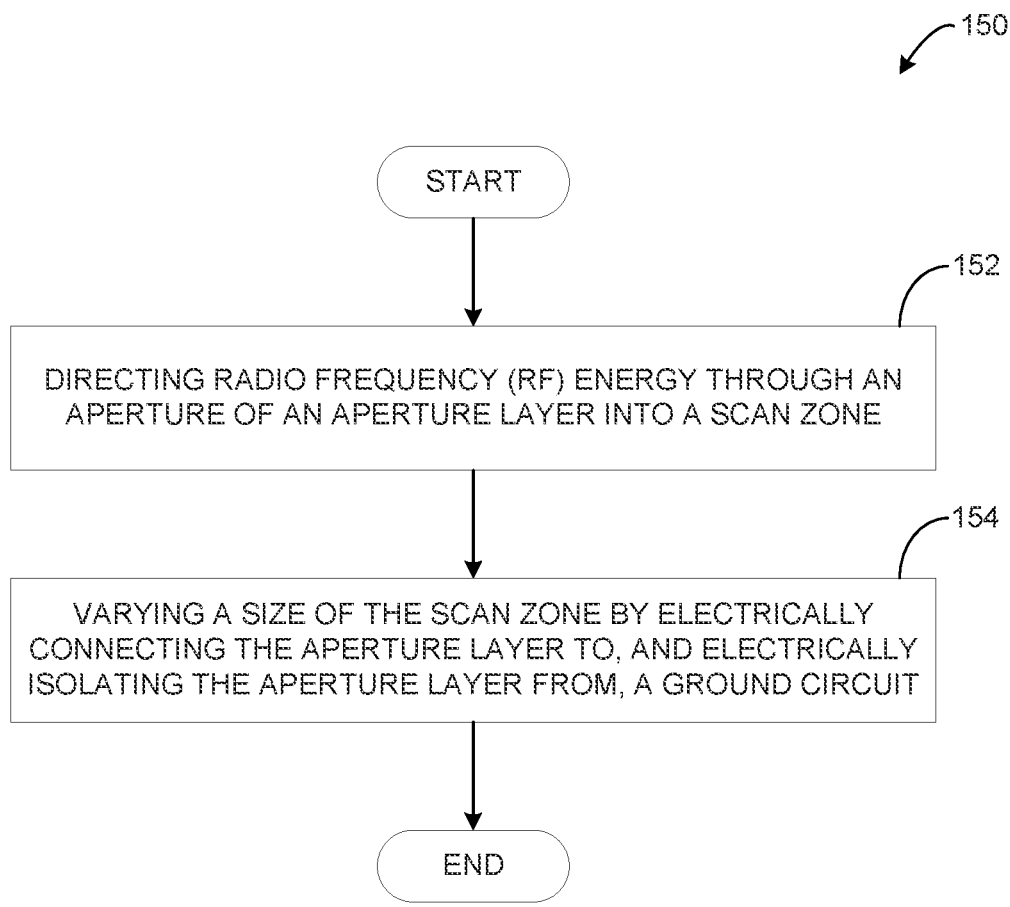
FIG. 8 is a flow diagram illustrating a method of adjusting the effective size of a scan zone area according to one embodiment of the present disclosure.

FIG. 8 is a flow diagram illustrating a method 150 for adjusting the effective size of a scan zone 24 according to one embodiment of the present disclosure. In this embodiment, method 150 of FIG. 8 is implemented by a computing device associated with SCO station 10 and may be co-located with SCO station 10 or disposed in a network and communicatively connected to SCO station 10.

As seen in FIG. 8, method 150 calls for directing radio frequency (RF) energy (e.g., the RF interrogation signals) through the aperture of an aperture layer (e.g., a layer in a PCB such as the first aperture layer 60) into a scan zone (box 152). Then, method 150 calls for varying a size of the scan zone 24 by electrically connecting the aperture layer to, and electrically isolating the aperture layer from, a ground circuit (box 154).

According to the present disclosure, one way in which to vary the size of the scan zone is to electrically connect the aperture layer to the ground circuit to decrease an effective size of the aperture in the aperture layer. Another way is to electrically isolate the aperture layer from the ground circuit to increase the effective size of the aperture in the aperture layer.

In such embodiments, electrically connecting the aperture layer to, and electrically isolating the aperture layer from, the ground circuit comprises selectively controlling a switch contacting the aperture layer to close and open, respectively.

In at least one embodiment of the present disclosure, the aperture layer comprises an RF shutter region surrounding a periphery of the aperture. In these cases, electrically connecting the aperture layer to the ground circuit configures the RF shutter region to block the RF energy from passing through the RF shutter region and electrically isolating the aperture layer from the ground circuit configures the RF shutter region to allow the RF energy to pass through the RF shutter region.

In one embodiment, the aperture layer comprises a first aperture layer and the method further calls for electrically connecting a second aperture layer to the ground circuit.

In such embodiments, an effective size of the aperture is decreased by electrically connecting the first and the second aperture layers to the ground circuit. The effective size of the aperture is increased by electrically isolating the first aperture layer from the ground circuit while maintaining an electrical connection between the second aperture layer and the ground circuit.

In at least one embodiment, the first aperture layer is connected to a first switch and the second aperture layer is connected to a second switch different from the first switch. In these cases, electrically connecting the first and the second aperture layers to the ground circuit comprises closing both the first and second switches, and electrically isolating the first aperture layer from the ground circuit comprises opening the first switch.

In one embodiment, the aperture layer is selectively electrically connected to, and selectively electrically isolated from, the ground circuit based on a timer.

In another embodiment, the aperture layer is selectively electrically connected to, and selectively electrically isolated from, the ground circuit based on a detected proximity of a user.

Figure 9:
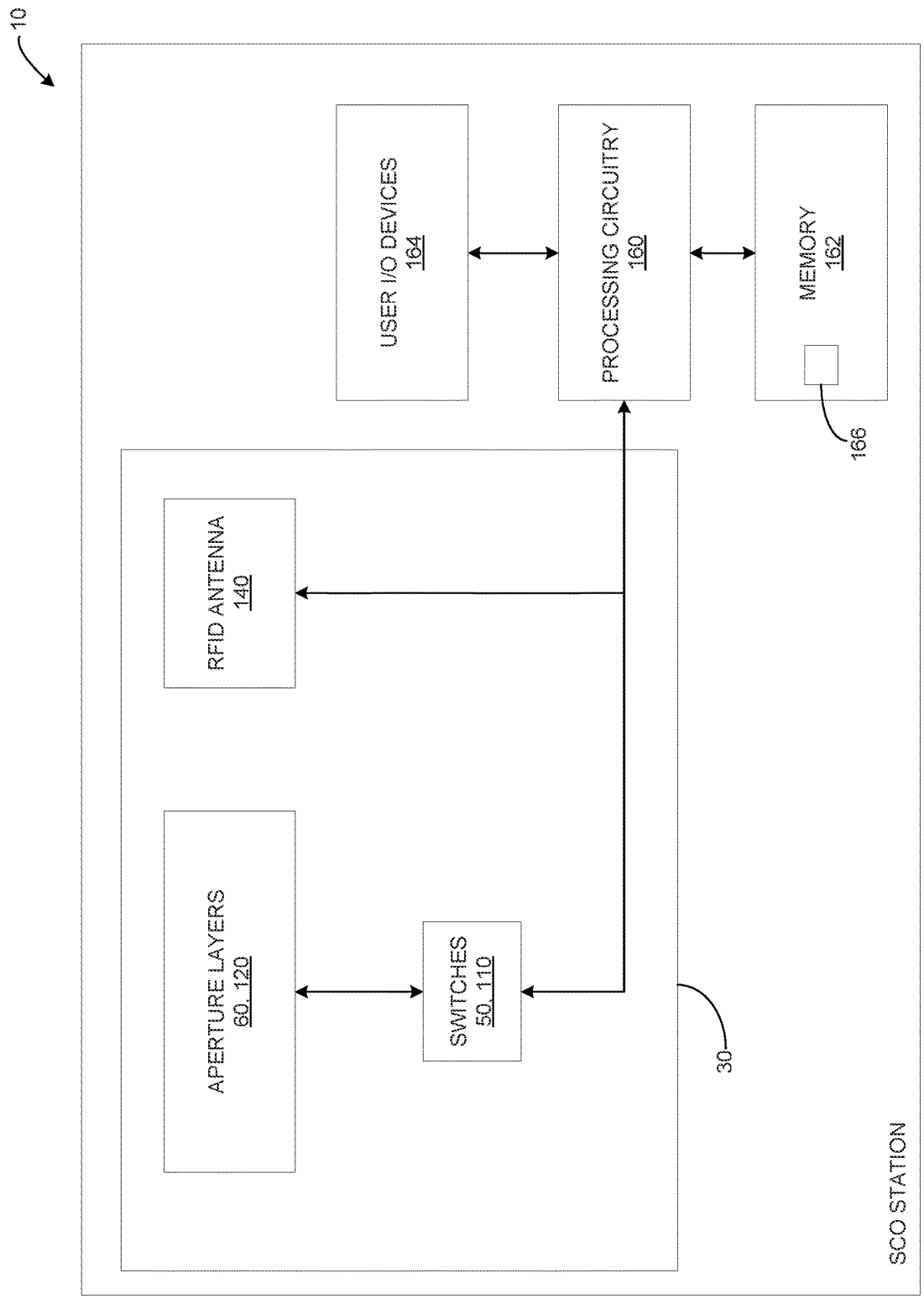
FIG. 9 is a block diagram illustrating some components of a RFID-enabled SCO station configured according to embodiments of the present disclosure.

FIG. 9 is a block diagram illustrating some components of a RFID-enabled SCO station 10 configured according to embodiments of the present disclosure. As seen in FIG. 9, SCO station 10 comprises processing circuitry 160, memory 162, a user Input/Output (I/O) interface 164, and the waveguide assembly 30. The memory 162 also stores a control program 166 comprising instructions that, when executed by processing circuitry 160, control the operation of the waveguide assembly 30 and SCO station 10, as previously described.

Processing circuitry 160, which in some embodiments may comprise a plurality of separate processor circuits, may comprise any sequential state machine operative to execute machine instructions stored as machine-readable computer programs stored in memory 162. As an example, processing circuitry 160 may comprise one or more hardware-implemented state machines (e.g., in discrete logic, FPGA, ASIC, etc.), programmable logic together with appropriate firmware, one or more stored-program, general-purpose processors, such as a microprocessor or Digital Signal Processor (DSP), together with appropriate software, or any combination of the above. Processing circuitry 160 is generally configured to control the operations and functions of the waveguide assembly 30 and SCO station 10 according to the data and instructions stored in memory 162. This includes being controlled to perform the previously described functions in accordance with the code and logic comprising control application 166.

For example, according to the present embodiments, processing circuitry 160 controls the waveguide assembly 30 to, inter alia, direct radio frequency (RF) energy through an aperture of one or more aperture layers into a scan zone and vary a size of the scan zone by electrically modifying an effective size of the aperture in at least one of the aperture layers. More particularly, as previously described, electrically connecting an aperture layer to a ground circuit decreases the effective size of the aperture in the aperture layer, and thereby decreases the effective size of the scan zone. On the other hand, electrically isolating the aperture layer from the ground circuit increases the effective size of the aperture in the aperture layer, thereby increasing the effective size of the scan area. In this manner, processing circuitry 160 can dynamically control the SCO station 10 to selectively switch between a "buy" mode of operation (i.e., a decreased scan zone area) and an "audit" mode of operation (i.e., an increased scan zone area).

The memory 162 is operatively connected to processing circuitry 160 and may comprise any non-transitory machine-readable media known in the art. Such media includes, but is not limited to, SRAM, DRAM, DDRAM, ROM, PROM, EPROM, Flash memory, and the like. As stated above, memory 162 stores the control application 166 that, when executed by processing circuitry 160, configures waveguide assembly 30 and SCO station 10 to perform the functions previously described. In one embodiment, memory 162 comprises circuitry that is positioned on the inside of SCO station 10. In other embodiments, however, memory 162 comprises memory that is at least partially disposed exterior to SCO station 10. Thus, in at least some embodiments, memory 162 may comprise an external database or other storage device communicatively connected to SCO station 10.

The User I/O interface 164 comprises one or more devices that allow a customer or other user to interact with, and control the operation of, SCO station 10 in accordance with the present embodiments. Such devices include, but are not limited to, display devices (including display 26 and/or other display devices equipped with a touchscreen), keyboards, keypads, scan zone 24, and payment transaction area 28.

The waveguide assembly 30, as stated above, comprises one or more aperture "layers," such as aperture layers 60, 120, one or more sets of switches 50, 110 carried on switch layer 40, and the RFID antenna 140. According to the present disclosure, processing circuitry 160 is configured to control the operation of each of these components to direct RF energy through the aperture(s) of the aperture layer(s) into the scan zone, and to actively vary the size of the scan zone by electrically modifying the effective size of the aperture in one of the aperture layers, as previously described.

FIG. 10 is a functional block diagram illustrating a computer program product, such as control program 166, configured to control a RFID-enabled SCO station 10 according to embodiments of the present disclosure. As seen in FIG. 10, control program 166 comprises an RFID antenna control unit/module 170, a scan zone adjuster control unit/module 172, a proximity detection unit/module 174, a timer unit/module 176, and an I/O unit/module 178. Each of the unit/modules comprises computer instructions that, when executed by processing circuitry 160, configure SCO station 10 and/or waveguide assembly 30 to function as previously described.

More particularly, the RFID antenna control unit/module 170 comprises instructions that, when executed by processing circuitry 160, causes RFID antenna 140 to transmit RFID signals, such as an RFID interrogation signal, for example, through the aperture(s) of one or more aperture layers or aperture layers, such as aperture layers 60, 120.

The scan zone adjuster control unit/module 172 comprises instructions that, when executed by processing circuitry 160, varies the effective size of the scan zone 24. To accomplish this, the instructions, when executed by processing circuitry 160, cause processing circuitry 160 to selectively and dynamically control electrical switches 50 and/or 110 to electrically connect respective aperture layers to a ground circuit 100, and to electrically isolate the respective aperture layers from the ground circuit 100. As stated above, the electrical connection/isolation functions increase and decrease the effective size of the variable aperture 62, 122 in the aperture layer 60, 120, thereby increasing and decreasing the effective size of the scan area 24.

The proximity detection unit/module 174 comprises instructions that, when executed by processing circuitry 160, detects the presence of a user proximate SCO station 10. In response to such detection, processing circuitry 160 generates one or more control signals to control the operation and functions of waveguide assembly 30 and SCO station 10, a previously described.

The timer unit/module 176 comprises instructions that, when executed by processing circuitry 160, starts and stops one or more timers that are utilized by processing circuitry 160 to dynamically electrically connect, and electrically isolate, the aperture layer to and from a ground circuit.

The I/O unit/module 178 comprises instructions that, when executed by processing circuitry 160, causes processing circuitry 160 to output information and data to display 26. Such information and data includes, but is not limited to, the data and information retrieved from the RFID tags of one or more products that were read when scan zone 24 was decreased in size and when scan zone 24 was increased in size.

The present embodiments may, of course, be carried out in other ways than those specifically set forth herein without departing from essential characteristics of the present disclosure. Therefore, the present embodiments are to be considered in all respects as illustrative and not restrictive, and all changes coming within the meaning and equivalency range of the appended claims are intended to be embraced therein.

What is claimed is:

1. A method comprising:
   directing radio frequency (RF) energy through an aperture of an aperture layer into a scan zone; and
   varying a size of the scan zone by electrically connecting the aperture layer to, and electrically isolating the aperture layer from, a ground circuit.

2. The method of claim 1 wherein varying a size of the scan zone comprises:
   electrically connecting the aperture layer to the ground circuit to decrease an effective size of the aperture in the aperture layer; and
   electrically isolating the aperture layer from the ground circuit to increase the effective size of the aperture in the aperture layer.

3. The method of claim 1 wherein electrically connecting the aperture layer to, and electrically isolating the aperture layer from, the ground circuit comprises selectively controlling a switch contacting the aperture layer to close and open, respectively.

4. The method of claim 1 wherein the aperture layer comprises a RF shutter region surrounding a periphery of the aperture, and wherein:
   electrically connecting the aperture layer to the ground circuit configures the RF shutter region to block the RF energy from passing through the RF shutter region; and electrically isolating the aperture layer from the ground circuit configures the RF shutter region to allow the RF energy to pass through the RF shutter region.

5. The method of claim 1 wherein the aperture layer comprises a first aperture layer, and wherein the method further comprises electrically connecting a second aperture layer to the ground circuit.

6. The method of claim 5 further comprising:
decreasing an effective size of the aperture by electrically connecting the first and the second aperture layers to the ground circuit; and
increasing the effective size of the aperture by electrically isolating the first aperture layer from the ground circuit while maintaining an electrical connection between the second aperture layer and the ground circuit.

7. The method of claim 6 wherein the first aperture layer is connected to a first switch and the second aperture layer is connected to a second switch different from the first switch, and wherein:
electrically connecting the first and the second aperture layers to the ground circuit comprises closing both the first and second switches; and
electrically isolating the first aperture layer from the ground circuit comprises opening the first switch.

8. The method of claim 1 wherein the aperture layer is selectively electrically connected to, and selectively electrically isolated from, the ground circuit based on a timer.

9. The method of claim 1 wherein the aperture layer is selectively electrically connected to, and selectively electrically isolated from, the ground circuit based on a detected proximity of a user.

10. A self-checkout (SCO) station comprising:
an aperture layer comprising an aperture;
a radio frequency (RF) antenna configured to emit RF energy through the aperture and into a scan zone; and
processing circuitry configured to selectively vary a size of the scan zone by electrically connecting the aperture layer to, and electrically isolating the aperture layer from, a ground circuit.

11. The SCO station of claim 10 wherein to vary a size of the scan zone, the processing circuitry is configured to:
decrease an effective size of the aperture by electrically connecting the aperture layer to the ground circuit; and
increase the effective size of the aperture by electrically isolating the aperture layer from the ground circuit.

12. The SCO station of claim 10 further comprising a switch operatively connected to the aperture layer, and wherein to vary a size of the scan zone, the processing circuitry is configured to selectively control the switch close and open thereby respectively electrically connecting the aperture layer to, and electrically isolating the aperture layer from, the ground circuit.

13. The SCO station of claim 10 wherein the aperture layer comprises a RF shutter region surrounding a periphery of the aperture, and wherein the RF shutter region is configured to:
block the RF energy from passing through the RF shutter region when the aperture layer is electrically connected to the ground circuit; and
allow the RF energy to pass through the RF shutter region when the aperture layer is electrically isolated from the ground circuit.

14. The SCO station of claim 10 wherein the aperture layer and the aperture comprise a first aperture layer and a first aperture, respectively, the SCO station further comprising a second aperture layer having a second aperture that is larger than the first aperture.

15. The SCO station of claim 14 wherein the first and second apertures are vertically aligned along a longitudinal axis that extends through the first and second apertures.

16. The SCO station of claim 14 wherein the processing circuitry is further configured to:
decrease an effective size of the first aperture by electrically connecting the first and the second aperture layers to the ground circuit; and
increase the effective size of the first aperture by electrically isolating the first aperture layer from the ground circuit and maintaining an electrical connection between the second aperture layer and the ground circuit.

17. The SCO station of claim 14 further comprising:
a first switch operatively connecting the first aperture layer to the ground circuit; and
a second switch operatively connecting the second aperture layer to the ground circuit, wherein the first switch is different from the second switch.

18. The SCO station of claim 17 wherein the processing circuitry is further configured to:
close both the first and second switches thereby electrically connecting the first and the second aperture layers to the ground circuit; and
open only the first switch thereby electrically isolating the first aperture layer from the ground circuit.

19. The SCO station of claim 17 further comprising:
a first electrical connecting member electrically connecting the first aperture layer to the first switch; and
a second electrical connecting member electrically connecting the second aperture layer to the second switch, wherein the second electrical connecting member extends through an opening formed in the first aperture layer to contact the second switch.

20. A non-transitory computer readable medium comprising a computer program stored thereon, the computer program comprising instructions that, when executed by processing circuitry of a self-checkout (SCO) station, causes the SCO station to:
direct radio frequency (RF) energy through an aperture of an aperture layer into a scan zone; and
vary a size of the scan zone by electrically connecting the aperture layer to, and electrically isolating the aperture layer from, a ground circuit.

* * * * *